(12) United States Patent
VanDenBerg et al.

(10) Patent No.: US 6,712,684 B2
(45) Date of Patent: Mar. 30, 2004

(54) ELECTRICAL STUNNING DEVICE

(75) Inventors: Eric S. VanDenBerg, Austin, MN (US); Thomas F. A. Jacobson, Austin, MN (US)

(73) Assignee: Hormel Foods, LLC, Austin, MN (US)

( * ) Notice: Subject to any disclaimer, the term of this patent is extended or adjusted under 35 U.S.C. 154(b) by 0 days.

(21) Appl. No.: 09/965,196

(22) Filed: Sep. 27, 2001

(65) Prior Publication Data

US 2003/0060153 A1 Mar. 27, 2003

(51) Int. Cl.[7] .................................................. A22B 3/06
(52) U.S. Cl. .............................. 452/60; 452/57; 452/58
(58) Field of Search ........................ 452/57, 58, 59, 452/60, 61, 62, 54, 53

(56) References Cited

U.S. PATENT DOCUMENTS

| | | | |
|---|---|---|---|
| 2,002,755 A | | 5/1935 | Regensburger |
| 2,185,949 A | | 1/1940 | Regensburger |
| 2,253,315 A | * | 8/1941 | Andrus ........................... 231/7 |
| 3,163,884 A | * | 1/1965 | Dunaway ..................... 452/60 |
| 3,167,809 A | | 2/1965 | Rollins |
| 3,258,811 A | | 7/1966 | Braun |
| 3,377,649 A | * | 4/1968 | Rains ........................... 452/60 |
| 4,031,591 A | | 6/1977 | Collins |
| 4,338,700 A | * | 7/1982 | Nijhuis ......................... 452/53 |
| 4,353,147 A | * | 10/1982 | Nijhuis ......................... 452/53 |
| 4,468,837 A | * | 9/1984 | Nijhuis ......................... 452/53 |
| 4,586,216 A | * | 5/1986 | Grajoszex .................... 452/53 |
| 4,716,625 A | | 1/1988 | Nijhuis |
| 4,747,184 A | | 5/1988 | Winsloe |
| 4,747,185 A | | 5/1988 | Thacker |
| 4,780,932 A | | 11/1988 | Bowman et al. |
| 5,326,307 A | | 7/1994 | Bernardus et al. |
| 5,486,145 A | | 1/1996 | Dorsthorst et al. |
| 5,704,830 A | | 1/1998 | Van Ochten |
| 5,906,540 A | * | 5/1999 | Grandin ....................... 452/58 |
| 6,338,673 B2 | * | 1/2002 | Berry et al. .................. 452/58 |

FOREIGN PATENT DOCUMENTS

| | | | |
|---|---|---|---|
| DE | 4037203 | * | 5/1992 |
| EP | 0021548 | * | 6/1979 |
| EP | 0564052 | * | 10/1993 |
| FR | 2599223 | * | 12/1987 |
| GB | 2170088 | * | 7/1986 |
| WO | WO 93/16599 | * | 9/1993 |

* cited by examiner

Primary Examiner—Peter M. Poon
Assistant Examiner—David J Parsley
(74) Attorney, Agent, or Firm—IPLM Group, P.A.

(57) ABSTRACT

An electrical stunning device (10) to stun and immobilize an animal includes a first contact tip (15) and a second contact tip (23) to contact the animal. The first contact tip (15) is operatively connected to a first voltage wire (47) and the second contact tip (23) is operatively connected to a second voltage wire (46). The second contact tip (23) is pivotable to activate a proximity switch (43), which closes the circuit and allows voltage to be applied to the first contact tip (15) via the first voltage wire (47) and the second contact tip (23) via the second voltage wire (46) to stun the animal.

17 Claims, 3 Drawing Sheets

ELECTRICAL STUNNING DEVICE

BACKGROUND OF THE INVENTION

1. Field of the Invention

The present invention relates to an electrical stunning device, and more particularly, to an electrical stunning device to stun and immobilize an animal.

2. Description of the Prior Art

Prior to slaughtering an animal, stunning devices are used to stun and immobilize the animal. Although stunning devices are used for stunning other types of animals, stunning devices are commonly used for stunning hogs. Previously, stunning devices could be triggered and charged with full stunning power prior to coming into contact with the animal. This resulted in full stunning voltage and current applied to the animal at the first or partial contact with the animal, which is inhumane and often causes burn marks on the animal making the meat less desirable. The present invention addresses these problems and does not allow the electrical stunning device to become energized until it is in full contact with the animal.

SUMMARY OF THE INVENTION

A preferred embodiment device for stunning an animal includes a first contact tip and a second contact tip. The first contact tip has a first contact surface for contacting the animal. The second contact tip has a second contact surface and is pivotable to allow the second contact surface to contact the animal. A circuit has a first voltage wire operatively connected to the first contact tip and a second voltage wire operatively connected to the second contact tip, and a proximity switch is proximate the second contact tip and is in series with the circuit. The proximity switch is activated when the second contact tip is pivoted and the second contact surface contacts the animal, wherein the proximity switch closes the circuit and allows voltage to be applied to the first contact tip and the second contact tip thereby stunning the animal.

A preferred embodiment device for stunning an animal includes a switch having a control wire, a proximity switch in series with the control wire, and a circuit having a first voltage wire operatively connected to a first contact tip and a second voltage wire operatively connected to a second contact tip. The second contact tip is pivotable thereby activating the proximity switch, wherein the proximity switch closes the circuit and allows voltage to be applied to the first contact tip and the second contact tip to stun the animal.

A preferred embodiment method for activating a stunning device when the stunning device is in contact with an animal, the stunning device having a first contact tip and a second contact tip, the first contact tip contacting the animal's neck and the second contact tip being placed proximate the animal's shoulder, includes the steps of pivoting the second contact tip to contact the animal's shoulder, wherein pivoting the second contact tip activates a proximity switch located proximate the second contact tip thereby closing a circuit and allowing voltage to be applied to the first contact tip and the second contact tip and stunning the animal with the first contact tip and the second contact tip.

In a preferred embodiment method for stunning an animal, the animal is directed in proximity to a stunning device. The stunning device includes a first contact tip operatively connected to a first voltage wire and a second contact tip operatively connected to a second voltage wire, the first voltage wire and the second voltage wire being part of a circuit. The first contact tip is placed on the animal, and the second contact tip is pivoted thereby placing the second contact tip on the animal and activating a proximity switch to close the circuit and allow voltage to be applied to the first contact tip and the second contact tip. The animal is stunned with the first contact tip and the second contact tip.

In a preferred embodiment method for stunning a hog, a stunning device is placed proximate the hog, and the stunning device has a first contact tip operatively connected to a first voltage wire and a second contact tip operatively connected to a second voltage wire. The first contact tip is placed to contact the hog's neck, and the second contact tip is pivoted to contact the hog's shoulder, wherein the presence of the hog is thereby sensed and the stunning device is activated. Voltage is applied to the first contact tip and the second contact tip thereby stunning the hog.

In a preferred embodiment method for stunning an animal, a first contact tip operatively connected to a first voltage wire is placed on an animal and a second contact tip operatively connected to a second voltage wire is placed on the animal, wherein the second contact tip is pivoted to contact the animal. The first contact tip and the second contact tip are ensured to be in full contact with the animal thereby avoiding a hot stun on the animal. Voltage is applied to the first voltage wire and the second voltage wire when the first contact tip and the second contact tip are in full contact with the animal thereby stunning the animal.

A preferred embodiment device for stunning an animal includes a first contact tip and a second contact tip for contacting the animal. The first contact tip is operatively connected to a first voltage wire, and the second contact tip is operatively connected to a second voltage wire and is pivotable to fully contact the animal. A stem is operatively connected to the second contact tip, wherein the stem is in a first position before the second contact tip is pivoted and the stem is in a second position after the second contact tip is pivoted to fully contact the animal. A proximity switch is activated when the stem is in the second position thereby allowing voltage to be applied to the first contact tip via the first voltage wire and the second contact tip via the second voltage wire when the second contact tip fully contacts the animal.

DETAILED DESCRIPTION OF THE PREFERRED EMBODIMENT

Figure 1:
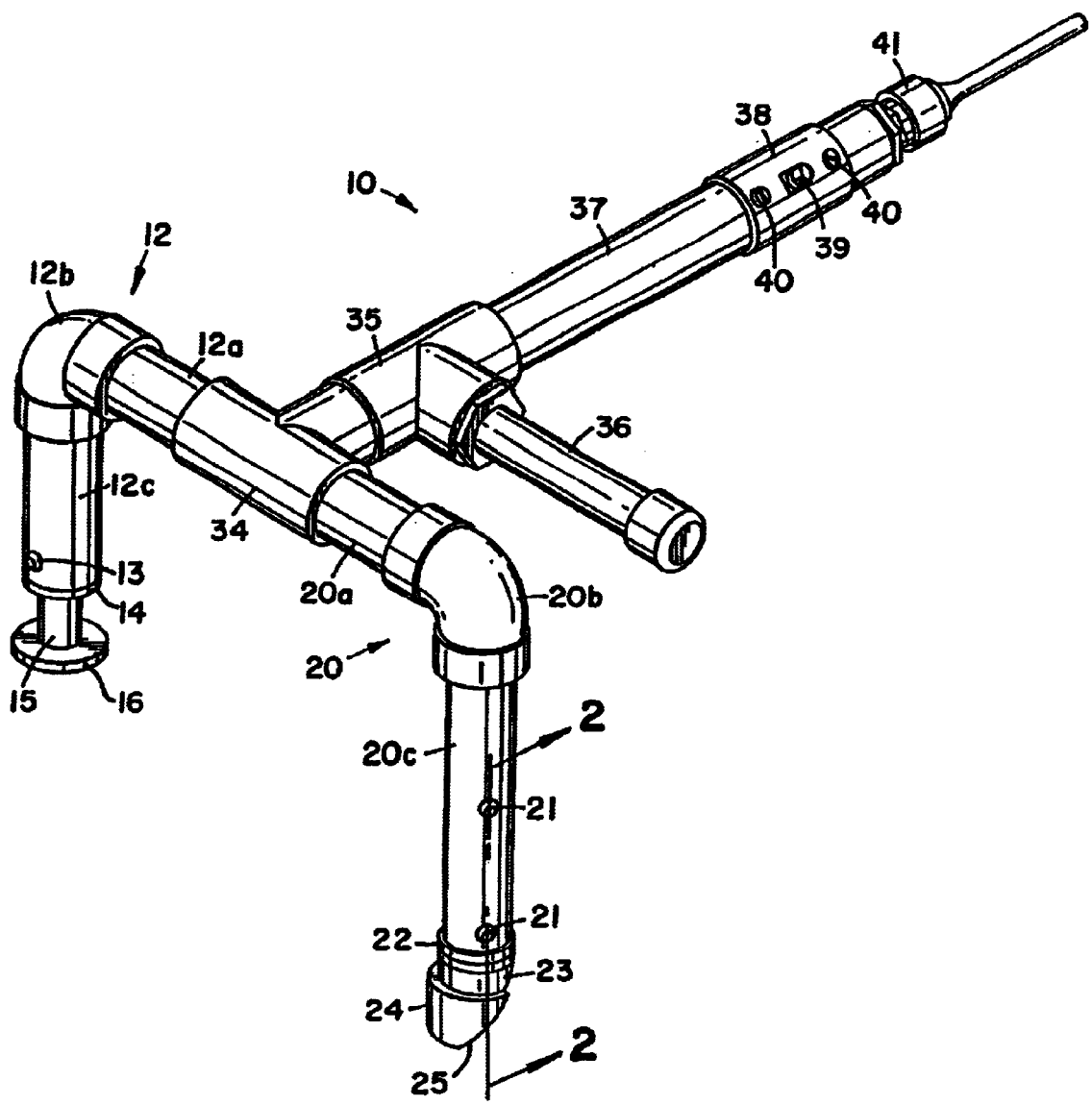
FIG. 1 is a perspective view of an electrical stunning device constructed according to the principles of the present invention.

The present invention relates to an electrical stunning device, and more particularly, to an electrical stunning device to stun and immobilize an animal prior to slaughter. An electrical stunning device constructed according to the principles of the present invention is designated by the numeral 10 in FIG. 1.

The electrical stunning device 10 is constructed and arranged to fit within a restrainer, which is not shown but is a device well-known in the art that is used to restrain an animal. Although the present invention may be used with a variety of animals, it is being discussed with respect to a hog. The electrical stunning device 10 includes a first arm 12 and a second arm 20 interconnected by a tee 34, and the tee 34 is further connected to a connector tube 35. The tee 34 forms a "T" with the first arm 12 and the second arm 20 forming the top of the "T" and the connector tube 35 forming the shaft of the "T". In the preferred embodiment, a one inch Sch80 PVC Tee is used for tee 34.

Figure 4:
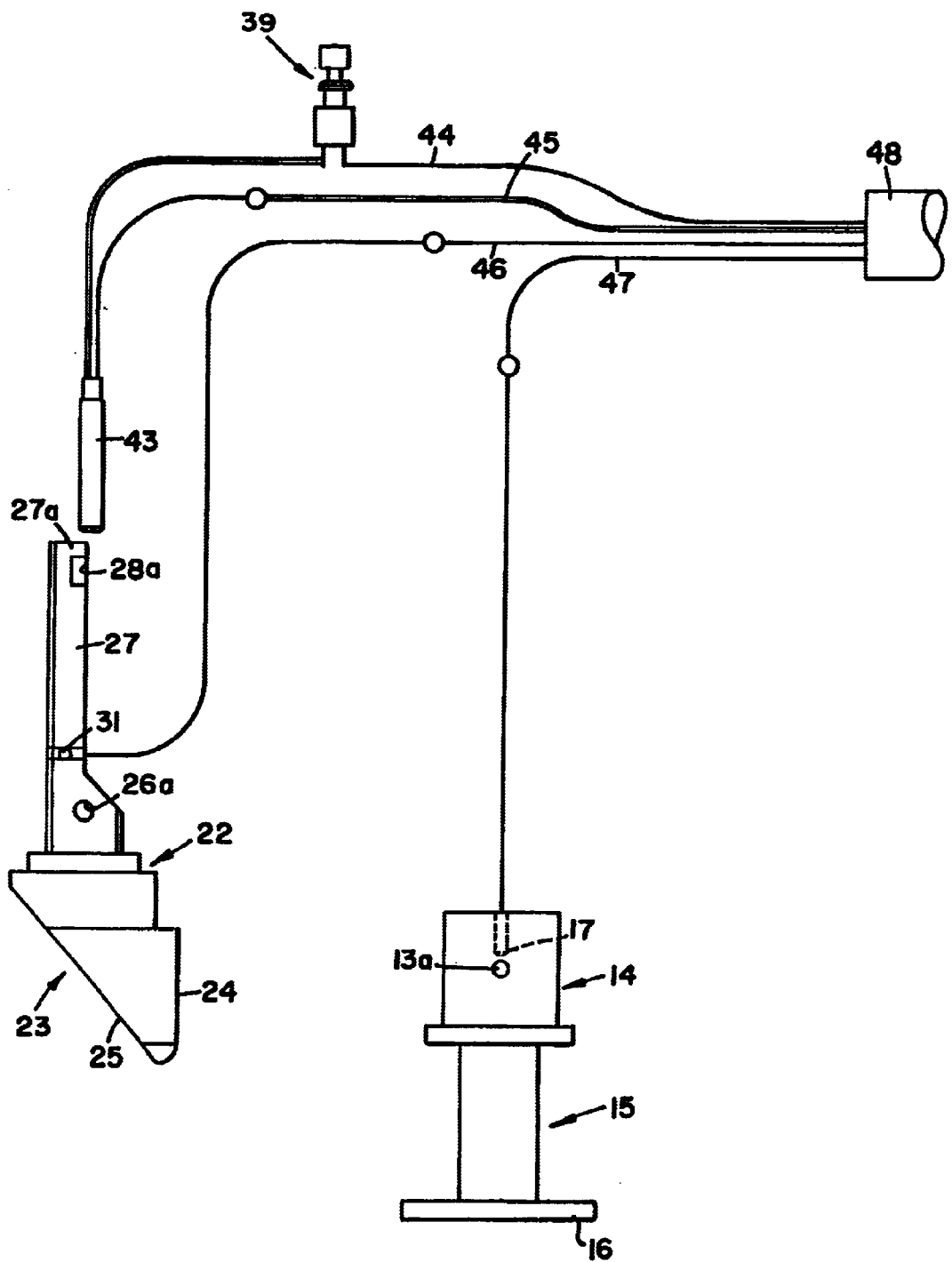
FIG. 4 is schematic view showing the electrical wiring of the electrical stunning device shown in FIG. 1.

The first arm 12 includes a first tube 12a, a second tube 12b, and a third tube 12c. The hollow, cylindrical tubes 12a–c are constructed and arranged to house and protect other components of the stunning device 10. The second tube 12b is curved at a right angle and interconnects the first tube 12a, which is positioned horizontally, and the third tube 12c, which is positioned vertically. The first tube 12a is operatively connected to the tee 34 and a cap portion 14 of a contact tip 15 is operatively connected to the end of the third tube 12c. A screw 13 secures the cap 14 through hole 13a to the third tube 12c. The contact tip 15 is integral with the cap 14 and includes a contact surface 16, which contacts the neck of the animal. A first voltage wire 47 is operatively connected to the cap 14 at an attachment point 17 as shown in FIG. 4.

Figure 2:
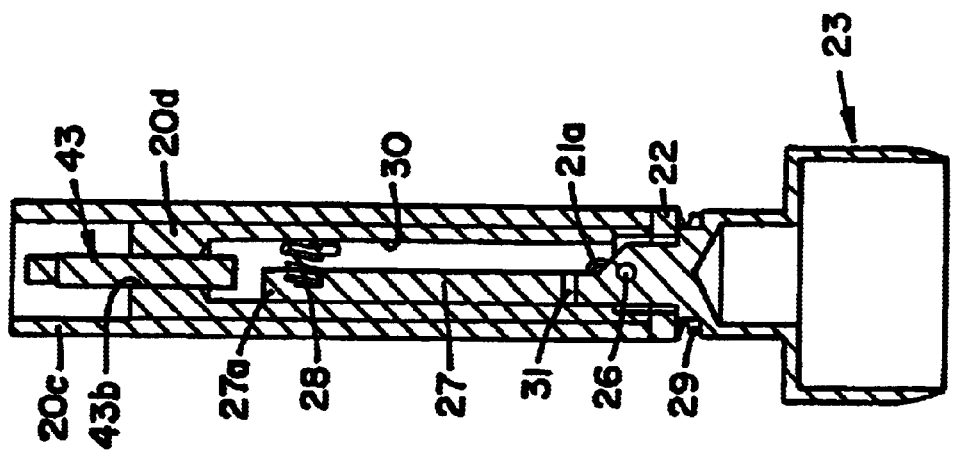
FIG. 2 is a cross section view of a contact tip of the electrical stunning device taken along the lines 2—2 shown in FIG. 1.
Figure 3:
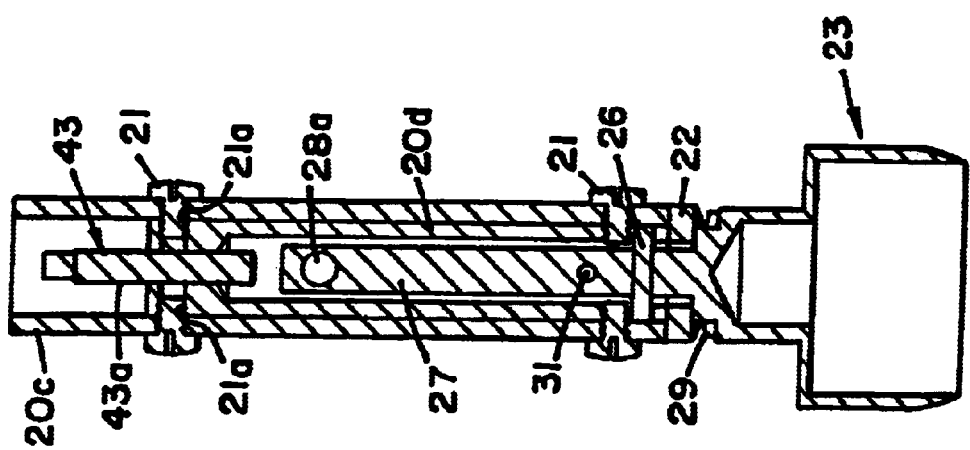
FIG. 3 is a right view of the contact tip cross section shown in FIG. 2.

The second arm 20 includes a first tube 20a, a second tube 20b, and a third tube 20c. An inner sleeve 20d fits within the third tube 20c from the bottom to approximately the middle of the third tube 20c, and screws 21 secure the inner sleeve 20d to the third tube 20c through holes 21a. The hollow, cylindrical tubes 20a–c and sleeve 20d are constructed and arranged to house and protect other components of the stunning device 10. The second tube 20b is curved at a right angle and interconnects the first tube 20a, which is positioned horizontally, and the third tube 20c, which is positioned vertically. The first tube 20a is operatively connected to the tee 34 opposite the first tube 12a, and a cap portion 22 of a contact tip 23 is operatively connected to the end of the third tube 20c and the inner sleeve 20d. A V-ring 29 seals the juncture between the cap portion 22 and the tube 20c and the sleeve 20d. The V-ring 29 is a rubber seal similar to a bellows with only one section. The contact tip 23 is integral with the cap 22 and includes a contact surface 24, which contacts the shoulder of the animal, and an angled surface 25 opposite the contact surface 24. The angled surface 25 of the contact tip 23 pivots away from the hog so that the contact surface 24 contacts the hog on the shoulder. The angled surface 25 is not necessary but allows clearance in the restrainer so that the contact surface 24 can adequately contact the hog. In other words, the angled surface 25 ensures that when the contact tip 23 is pivoted, the restrainer does not interfere with the contact tip 23. A stem 27 is operatively connected to the cap 22 and extends into the hollow cavity 30 of the inner sleeve 20d. In the preferred embodiment, the stem 27 and the cap 22 are a unitary structure. The stem 27 includes a top portion 27a, which is the area that is sensed by a proximity switch 43, and a spring receptacle 28a, which is just below the top portion 27a and receives a spring 28. The spring 28 is also operatively connected to the inside surface of the sleeve 20d and holds the stem 27 against the opposite side of the sleeve 20d to where the spring 28 is attached. A hole 26a proximate the bottom of stem 27 receives a pin 26, about which the contact tip 23 and the stem 27 pivot. When the stem 27 is pivoted, the spring 28 is compressed and the stem 27 is more centered within the cavity 30. A second voltage wire 46 is operatively connected to the stem 27 of the contact tip 23 at an attachment point 31 as shown in FIG. 4. FIG. 2 shows a cross sectional view of the third tube 20c taken along the lines 2—2 in FIG. 1, and FIG. 3 shows a right side view of FIG. 2 turned ninety degrees.

The inner sleeve 20d includes a top with a threaded hole 43b proximate the center of the top into which a proximity switch 43 having threads 43a is threaded. In the preferred embodiment, the proximity switch 43 is an Efector proximity switch. The proximity switch 43 is in series with a first control wire 44 and a second control wire 45, and a push button on/off control switch 39 is operatively connected to the first control wire 44 as shown in FIG. 4. It is understood that a proximity switch, a foot switch, or another type of switch known in the art could be used in lieu of the control switch 39 shown in the preferred embodiment.

The connector tube 35 further connects to a switch tube 37 and also includes a handle 36, which protrudes at a ninety degree angle parallel to the first tube 20a. The switch tube 37 includes a switch cover 38, which houses the on/off control switch 39. Screws 40 secure the switch cover 38 on the switch tube 37.

A circuit includes the first high voltage wire 47 and the second high voltage wire 46. The first control wire 44, the second control wire 45, and the second high voltage wire 46 run through the second arm 20; and the first high voltage wire 47 runs through the first arm 12. These wires then run through the tee 34 into the connector tube 35 and the switch tube 37 and terminate inside a plug 48. A power supply (not shown) is attached to the plug 48 by a plug and cord 41.

A control such as a capacitor or a battery, which is not shown, serves through the on/off switch 39 and the proximity switch 43 back to a variable frequency drive. The control controls the frequency and the voltage of the stun to rise at a certain rate, and the variable frequency drive allows for the stun to be controlled in frequency and voltage and shapes the stunning voltage to optimize the stun. Any number of types of variable frequency drives could be used to control the power supplies.

In operation, the stunning device 10 is placed on the hog within a restrainer by grabbing the handle 36 and the switch tube 37. The handle 36 supplies torque when pressure is applied with the stunning device 10 on the hog. The contact tip 15 is placed against the neck of a hog and the contact tip 23 is placed against the shoulder area of the hog. The contact surface 16 of the contact tip 15 contacts the neck of the hog. As the contact tip 23 is being placed against the shoulder area of the hog, the contact tip 23 and the stem 27 pivot about pin 26 so that the contact surface 24 contacts the shoulder of the hog. The pivoting action of the contact tip 23 compresses the spring 28 and places the stem 27 in alignment with the proximity switch 43. The spring 28 returns the stem 27 back into position when the contact tip 23 is not in contact with the hog. In the preferred embodiment, the spring 28 is approximately 16.52 pounds per inch. The spring 28 should be stiff enough to make the operator plant the other side of the stunning device 10 on the hog for leverage. The contact tip 23 remains on the same plane as it is pivoted. The stem 27 is made of metal, and when spring 28 is compressed, the top portion 27a is moved within the sensing area of the proximity switch 43. Thus, moving the top portion 27a of stem 27 into the sensing range of the proximity switch 43 completes the circuit and allows the operator to start the stun cycle. The push button on/off switch 39 is in series with the proximity switch 43, and both switches must be closed for the stunning device 10 to work. Therefore, it is necessary that the contact surface 24 be in contact with the hog in order for the stem 27 to trigger the proximity switch 43, which allows the electrical current to be applied after the stunning device 10 sufficiently contacts the hog. When the circuit is complete, the operator can activate the on/off switch 39 to apply the current to the hog thereby stunning the hog.

Although the present invention only shows one proximity switch 43, it is understood that proximity switches could be placed on both contact tips. However, this is not required in the present invention because it is difficult to get the shoulder contact tip in place without already having the neck contact tip in place. Therefore, only one proximity switch is necessary.

The electromechanical means verify that the stunning device 10 is in sufficient contact with the hog before the operator can trigger the stunning cycle thereby eliminating burn marks and preventing full stunning voltage and current until after the stunning device has made sufficient contact with the hog. In addition, the increase in the surface area of the contact tips distributes the voltage more evenly on the hog. Therefore, the present invention results in improved meat quality by reducing the PSE, the broken backbones, and the blood splattering in the loin, the ham and the shoulder portions of the hog. Also, an improved skin quality results by eliminating excess burn marks on the hog.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A device adapted to be manually placed upon an animal for stunning the animal, comprising:
    a. a first contact tip having a first contact surface, said first contact surface contacting the animal;
    b. a second contact tip having a second contact surface, said second contact tip being pivotable to allow said second contact surface to contact the animal after contact has been established with said first contact surface;
    c. a circuit having a first voltage wire and a second voltage wire, said first voltage wire operatively connected to said first contact tip and said second voltage wire operatively connected to said second contact tip; and
    d. a proximity switch proximate said second contact tip and in series with said circuit, said proximity switch being activated when said second contact tip is pivoted and said second contact surface contacts the animal, wherein said proximity switch closes said circuit and allows voltage to be applied to said first contact tip and said second contact tip after said second contact tip has been pivoted and said second contact surface contacts the animal thereby stunning the animal.

2. The device of claim 1, further comprising a stem operatively connected to said second contact tip, wherein said stem is pivoted and sensed by said proximity switch.

3. A device adapted to be manually placed upon an animal for stunning the animal, comprising:
    a. a switch, said switch having a control wire;
    b. a proximity switch in series with the control wire, said proximity switch sensing when contact has been made with the animal; and
    c. a circuit having a first voltage wire operatively connected to a first contact tip and a second voltage wire operatively connected to a second contact tip, said second contact tip being pivotable thereby activating said proximity switch, wherein said proximity switch closes said circuit and allows voltage to be applied to said first contact tip and said second contact tip to stun the animal when contact with the animal has been made with both said first contact tip and said second contact tip thereby sensing when contact has been made with the animal said second contact tip being pivoted to contact the animal after contact has been established with said first contact tip.

4. A method for activating a stunning device when the stunning device is in contact with an animal, the stunning device having a first contact tip and a second contact tip, the first contact tip contacting the animal's neck and the second contact tip being placed proximate the animal's shoulder; comprising:
    a. manually pivoting the second contact tip to contact the animal's shoulder after contact has been established with the first contact tip, wherein pivoting the second contact tip activates a proximity switch located proximate the second contact tip thereby closing a circuit and allowing voltage to be applied to the first contact tip and the second contact tip after said second contact tip has been pivoted; and
    b. stunning the animal with the first contact tip and the second contact tip.

5. A method for stunning an animal, comprising:
    a. directing the animal in proximity to a manual stunning device adapted to be placed upon the animal, said stunning device including a first contact tip operatively connected to a first voltage wire and a second contact tip operatively connected to a second voltage wire, the first voltage wire and the second voltage wire being part of a circuit;
    b. placing said first contact tip on the animal;
    c. pivoting said second contact tip after contact has been established with said first contact tip thereby placing said second contact tip on the animal and activating a proximity switch to close the circuit and allow voltage to be applied to said first contact tip and said second contact tip after said second contact tip has been pivoted; and
    d. stunning the animal with said first contact tip and said second contact tip.

6. A method for stunning a hog, comprising:
    a. placing a manual stunning device adapted to be placed upon the hog proximate the hog, the stunning device having a first contact tip operatively connected to a first voltage wire and a second contact tip operatively connected to a second voltage wire;
    b. placing the first contact tip to contact the hog's neck;
    c. pivoting the second contact tip to contact the hog's shoulder, wherein the presence of the hog is thereby sensed and the stunning device is activated, contact being established with said first contact tip and said second contact tip at separate times; and
    d. applying voltage to the first contact tip and the second contact tip after said second contact tip has been pivoted thereby stunning the hog.

7. A method for manually stunning an animal, comprising:
    a. placing a first contact tip operatively connected to a first voltage wire on an animal;
    b. placing a second contact tip operatively connected to a second voltage wire on the animal, wherein said second contact tip is pivoted to contact the animal after contact has been established with said first contact tip;

c. ensuring the first contact tip and the second contact tip are in fall contact with the animal thereby avoiding a hot stun on the animal; and d. applying voltage to the first voltage wire and the second voltage wire when the first contact tip and the second contact tip are in full contact with the animal thereby stunning the animal.

8. A device adapted to be manually placed upon an animal for stunning the animal, comprising:

a. a first contact tip and a second contact tip for contacting the animal, said first contact tip being operatively connected to a first voltage wire, said second contact tip being operatively connected to a second voltage wire and being pivotable to fully contact the animal;

b. a stem, said stem being operatively connected to said second contact tip, wherein said stem is in a first position before said second contact tip is pivoted and said stem is in a second position after said second contact tip is pivoted to fully contact the animal; and c. a proximity switch, said proximity switch being activated when said stem is in the second position thereby allowing voltage to be applied to said first contact tip via said first voltage wire and said second contact tip via said second voltage wire when said first contact tip and said second contact tip frilly contact the animal after said second contact tip has been pivoted, said second contact tip being pivoted after contact has been established with said first contact tip.

9. The device of claim 8, further comprising a housing surrounding said stem, said stem being pivotably mounted within said housing, wherein said stem is pivoted within said housing when said second contact is pivoted to fully contact the animal.

10. The device of claim 1, further comprising a first arm operatively connected to a second arm, the first arm being operatively connected to the first contact tip and the second arm being operatively connected to the second contact tip, the first contact tip being secured to the first arm and the second contact tip pivoting proximate the connection to the second arm.

11. The device of claim 3, further comprising a first arm operatively connected to a second arm, the first arm being operatively connected to the first contact tip and the second arm being operatively connected to the second contact tip, the first contact tip being secured to the first arm and the second contact tip pivoting proximate the connection to the second arm.

12. The device of claim 8, further comprising a first arm operatively connected to a second arm, the first arm being operatively connected to the first contact tip and the second arm being operatively connected to the second contact tip, the first contact tip being secured to the first arm and the second contact tip pivoting proximate the connection to the second arm.

13. A device adapted to be manually placed upon an animal for stunning the animal, comprising:

a. a first arm having a first contact tip for contacting the animal;

b. a second arm secured to said first arm and having a second contact tip for contacting the animal, wherein contact with the animal is made with said first contact tip, rotation of said first arm rotates said second arm, and then said second contact tip is pivoted to contact the animal, said second contact tip being pivotable independently of said first contact tip after contact has been made with said first contact tip; and c. a proximity switch in series with a first voltage wire and a second voltage wire, said first voltage wire operatively connected to said first contact tip and said second voltage wire operatively connected to said second contact tip, said second contact tip activating said proximity switch when pivoted thereby allowing voltage to be applied to said first contact tip and said second contact tip to stun the animal when contact has been made with both said first contact tip and said second contact tip after said second contact tip has been pivoted.

14. The device of claim 13, wherein the first contact tip is secured to the first arm and the second contact tip pivots proximate a connection to the second arm.

15. A method for stunning an animal, comprising:

a. obtaining a stunning device adapted to be manually placed upon the animal including a first arm having a first contact tip and a second arm having a second contact tip, said second arm being secured to said first arm, wherein rotation of said first arm rotates said second arm;

b. placing said first contact tip operatively connected to a first voltage wire on the animal, said first contact tip contacting the animal;

c. rotating said first arm thereby rotating said second arm toward the animal while maintaining contact with the first contact tip and the animal;

d. placing said second contact tip operatively connected to a second voltage wire on the animal, the second contact tip pivoting to contact the animal after contact has been established with the first contact tip, said second contact tip being pivotable independently of said first contact tip;

e. ensuring the first contact tip and the second contact tip are in full contact with the animal thereby avoiding a hot stun on the animal; and f. applying voltage to the first voltage wire and the second voltage wire when the first contact tip and the second contact tip are in full contact with the animal thereby stunning the animal.

16. The method of claim 15, further comprising activating a proximity switch with said second contact tip when said second contact tip has been pivoted to contact the animal, the proximity switch ensuring the first contact tip and the second contact tip are in full contact with the animal and allowing voltage to be applied to the first voltage wire and the second voltage wire to stun the animal.

17. The method of claim 15, further comprising pivoting said first contact tip to contact the animal, the first contact tip and the second contact tip pivoting independently from one another, the second contact tip contacting the animal after contact has been established with said first contact tip.

* * * * *

UNITED STATES PATENT AND TRADEMARK OFFICE
CERTIFICATE OF CORRECTION

PATENT NO. : 6,712,684 B2 Page 1 of 1
DATED : March 30, 2004
INVENTOR(S) : Eric S. VanDenBerg et al.

It is certified that error appears in the above-identified patent and that said Letters Patent is hereby corrected as shown below:

Column 7,
Line 28, delete "frilly" and insert therefore -- fully --

Signed and Sealed this

Thirteenth Day of July, 2004

JON W. DUDAS
*Acting Director of the United States Patent and Trademark Office*